US012467283B2

(12) United States Patent
Zhang et al.

(10) Patent No.: US 12,467,283 B2
(45) Date of Patent: Nov. 11, 2025

(54) PULL-DOWN LOCK

(71) Applicant: ZHEJIANG SANYI INDUSTRY AND TRADING CO.,LTD., Zhejiang (CN)

(72) Inventors: Junhui Zhang, Zhejiang (CN); Kai Xie, Zhejiang (CN); Chen Chen, Zhejiang (CN)

( * ) Notice: Subject to any disclaimer, the term of this patent is extended or adjusted under 35 U.S.C. 154(b) by 95 days.

(21) Appl. No.: 18/513,478

(22) Filed: Nov. 17, 2023

(65) Prior Publication Data

US 2025/0129635 A1 Apr. 24, 2025

(30) Foreign Application Priority Data

Oct. 18, 2023 (CN) ......................... 202322794963.0

(51) Int. Cl.
*E05B 65/00* (2006.01)
*E04H 15/32* (2006.01)

(52) U.S. Cl.
CPC ............. *E05B 65/00* (2013.01); *E04H 15/32* (2013.01)

(58) Field of Classification Search
CPC .. E05B 65/00; E05B 65/0003; E05B 65/0017; E05B 65/462; E04H 15/32; E04H 15/322; E04H 15/38; E04H 15/44; E04H 15/60; E04H 15/62; E04H 15/64; E04H 2015/328
USPC ................................................................ 70/57
See application file for complete search history.

(56) References Cited

U.S. PATENT DOCUMENTS

| | | | | |
|---|---|---|---|---|
| 11,821,228 B2* | 11/2023 | Sun | ......................... | E04H 15/60 |
| 11,988,007 B2* | 5/2024 | Liu | ......................... | E04H 15/32 |
| 2018/0125184 A1* | 5/2018 | Song | ......................... | E04H 15/34 |
| 2021/0355703 A1* | 11/2021 | Sun | ......................... | E04H 15/60 |
| 2022/0325733 A1* | 10/2022 | Sekkesæter | ........... | F16B 5/0266 |

* cited by examiner

*Primary Examiner* — Nathan Cumar
(74) *Attorney, Agent, or Firm* — Che-Yang Chen; Law Office of Michael Chen

(57) ABSTRACT

A pull-down lock, may include a top cover, wherein the bottom end of the top cover is fixedly connected with the pull rod, and the bottom end of the pull rod is fixedly connected with the lock head; besides, the lock bolt component for limiting and fixing the lock head is arranged in the movable part upper cover, and the movable part base is slidably inserted into the bottom end of the movable part upper cover; the movable part base is internally provided with the pull-down component which is adapted to and penetrates through the lock bolt component. When the movable part base is pulled to move downwards, the lock bolt component could be pushed to move under the cooperation of the pull-down component, so that the limiting and fixation of the lock head is released.

8 Claims, 5 Drawing Sheets

PULL-DOWN LOCK

FIELD OF THE INVENTION

The invention relates to the technical field of tent central mechanism locks, in particular to the pull-down lock.

BACKGROUND OF THE INVENTION

The outdoor folding tent has the advantages of sun protection and rain protection when being unfolded, and could be folded when being carried, so it is widely used in daily life. During the process of unfolding or folding the tent, the locking mechanism on each support leg requires to be locked or unlocked one by one. However, the traditional folding tent has the following shortcomings:

The folding and unfolding process of this kind of tent is still complicated with many steps, it takes many steps to lock many parts of the tent during folding and unfolding process, which reduces the operating efficiency. Besides, the tent is large and is generally not easy for one person to operate, two or more people are needed to cooperate in the folding and unfolding process.

SUMMARY OF THE DISCLOSURE

In view of this, the purpose of this invention is to provide a pull-down lock, which aims to solve the problems mentioned in the above background.

The present invention provides a pull-down lock that comprises the top cover, the bottom end of the top cover is fixedly connected with the pull rod, and the bottom end of the pull rod is fixedly connected with the lock head, which also comprises the movable part upper cover for inserting the lock head, wherein the lock bolt component for limiting and fixing the lock head is arranged in the movable part upper cover, the movable part base is slidably inserted into the bottom end of the movable part upper cover, the pull-down components which is adapted to and penetrates through the lock bolt component is arranged in the movable part base. When the movable part base is pulled downward, the lock bolt component could be pushed to move under the cooperation of the pull-down components to release the limiting and fixing of the lock head.

Preferably, the surface of the pull rod has an arc surface near its bottom end, the lock head is in hemispherical shape, the diameter of the lock head is larger than the cross-sectional diameter of the pull rod.

Preferably, the lock bolt support piece for supporting the lock bolt component is fixedly installed within the movable part upper cover through the screws.

Preferably, the lock bolt component comprises the left lock bolt and the right lock bolt which are slidably arranged on the lock bolt support piece, wherein the ends of the left lock bolt and the right lock bolt are both provided with arc grooves which are adapted to the arc surfaces, the left lock bolt and the right lock bolt are both provided with notches which could passed through by the pull-down components, and the inner walls of the notches are provided with inclined surfaces, the elastic thrust component for pushing the left lock bolt and the right lock bolt to move and clamp the bottom end of the pull rod is arranged in the movable part upper cover.

Preferably, the elastic thrust component includes the spring, one end of which abuts against the movable part upper cover, and the other end of which abuts against the left lock bolt or the right lock bolt, and both the left lock bolt and the right lock bolt are fixedly connected with the guide column inserted into the spring.

Preferably, the pull-down components include the fixing column fixedly connected within the movable part base, two pull-down plates penetrating through the notch are fixedly connected to the fixing column.

Preferably, the pull-down plates include the inclined plate and the straight plate, wherein the inclined plate are fixedly connected to the fixing column, and the inclined surface of the inclined plate is matched with the inclined surface in the notch.

Preferably, the fixing column is provided with the placing groove for placing the lock head.

The invention provides a pull-down lock is advantageous because when the locking of the pull rod needs to be released and the folding tent needs to be folded, the movable part base is pulled downwards through the cooperation of the lock bolt component and the pull-down component, and the pull-down component is driven to move downwards, so that the lock bolt component moves to the side far away from the pull rod, which causes the lock bolt component to release the limiting and fixation of the lock head. Therefore, the folding tent could be folded and unfolded conveniently, the operation could be completed by one person, and the operation is simple and convenient.

BRIEF DESCRIPTION OF THE DRAWINGS

Other features, objects and advantages of the present invention will be more clearly and completely by the detailed description of the non-limiting embodiments with reference to the attached drawings. Obviously, the described embodiments are only part of the embodiments of the present invention, but not all of them. Based on the embodiment of the present invention, all other embodiments obtained by ordinary technicians in the field without creative labor are within the scope of the present invention.

DETAILED DESCRIPTION OF THE PREFERRED EMBODIMENTS

It should be noted that, unless otherwise stated, technical terms or scientific terms used in the embodiments of the present invention should have the ordinary meanings as understood by Person of ordinary skill in the field to which the present invention belongs.

It should be noted that the terms “first”, “second” and the like in the description and claims of the present invention and the above drawings are used to distinguish similar objects, which are not necessarily used to describe a specific order or sequence; the terms “comprising” and “having” and any variations thereof, are intended to cover non-exclusive inclusion; the terms “connected” are not limited to physical or mechanical connection, but also include electrical connection, directly or indirectly; the use of orientation words such as “upper, lower” generally refers to the orientation under state of use. “Inside and outside” means inside and outside relative to the contours of each component itself. It is to be understood that the data so used are interchangeable under appropriate circumstances in order to describe the embodiments of the invention herein.

Figure 1:
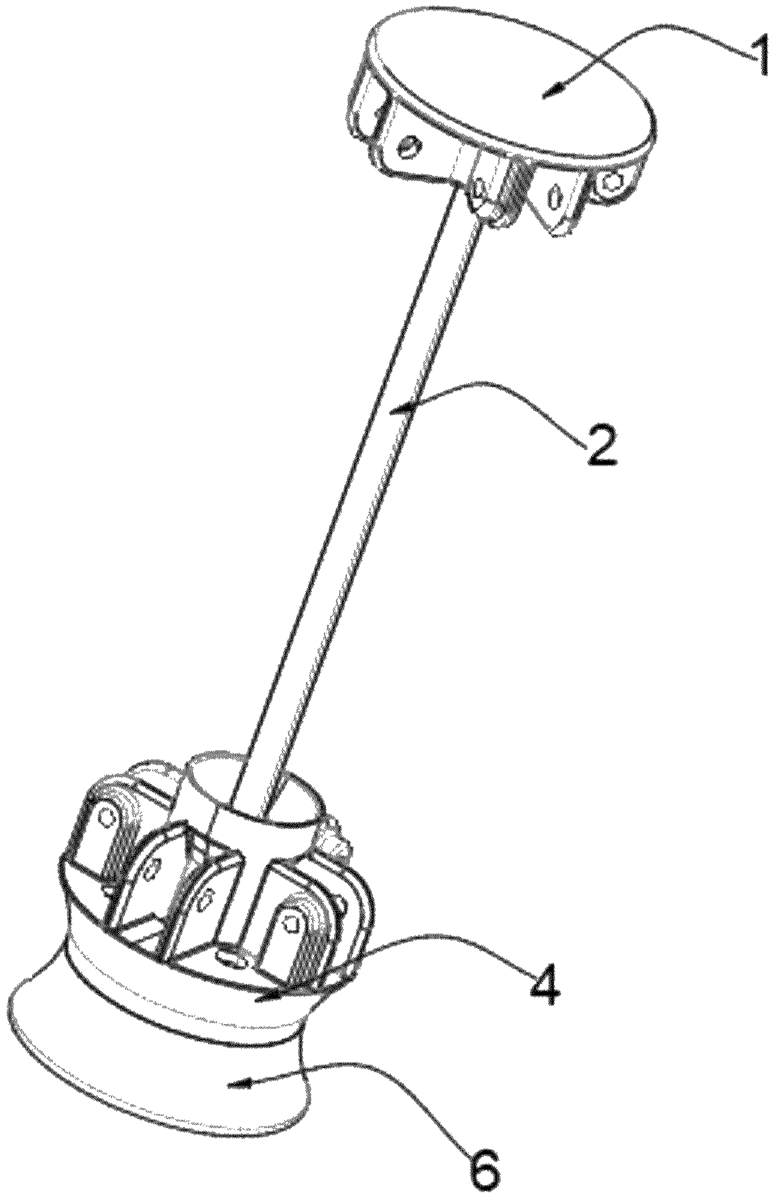
FIG. 1 is the schematic structural view of the present invention.
Figure 2:
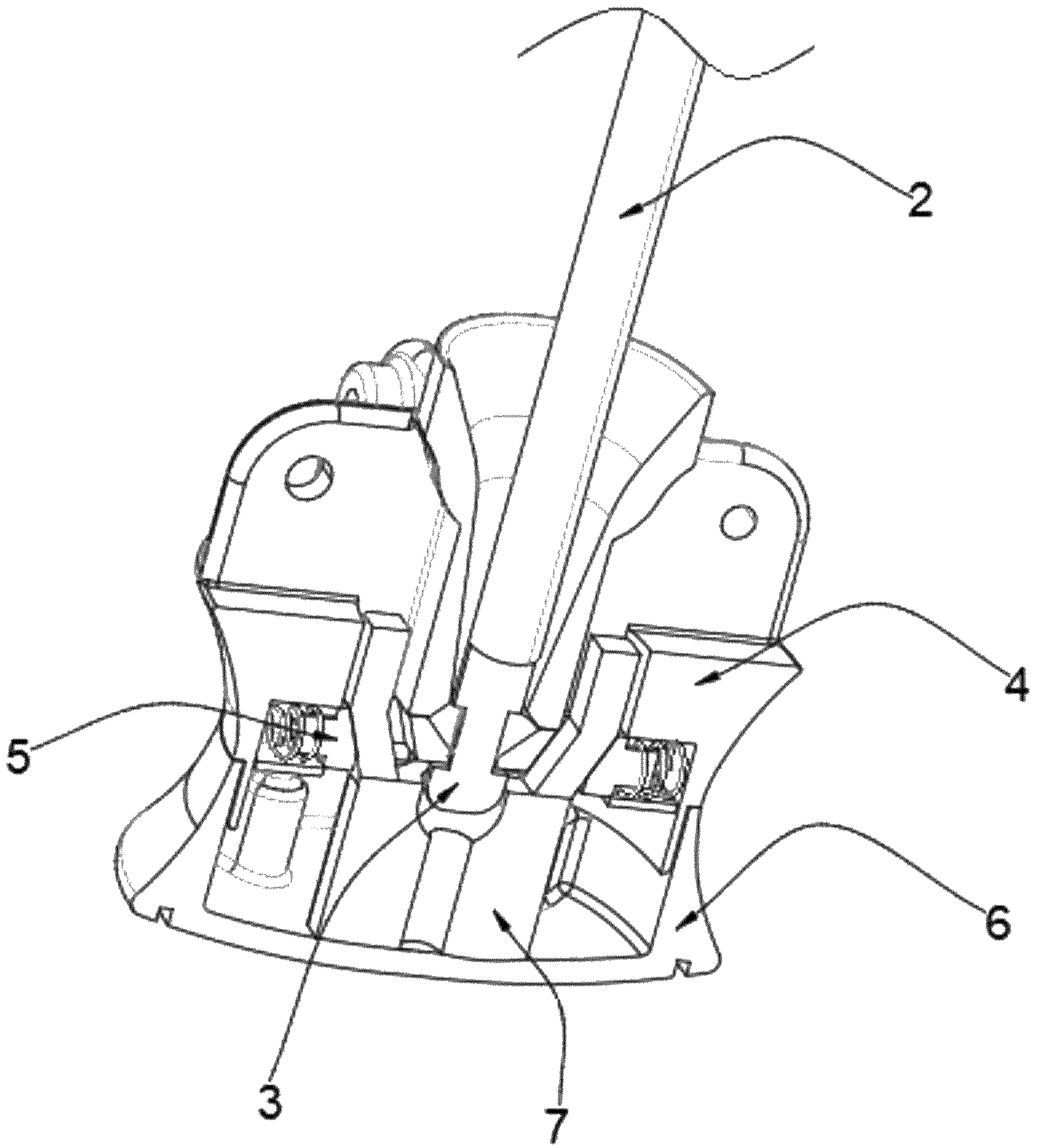
FIG. 2 is the sectional view of the present invention.
Figure 3:
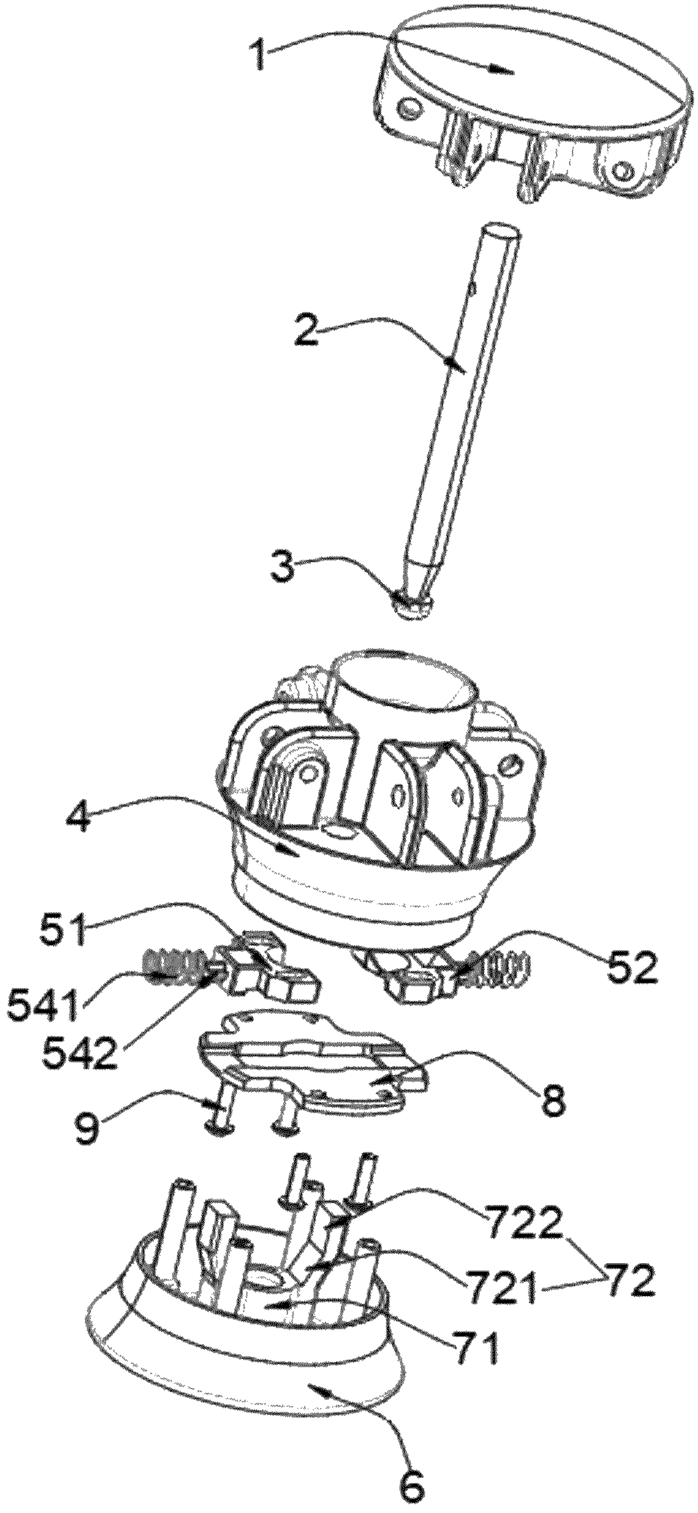
FIG. 3 is an exploded view of the present invention.
Figure 4:
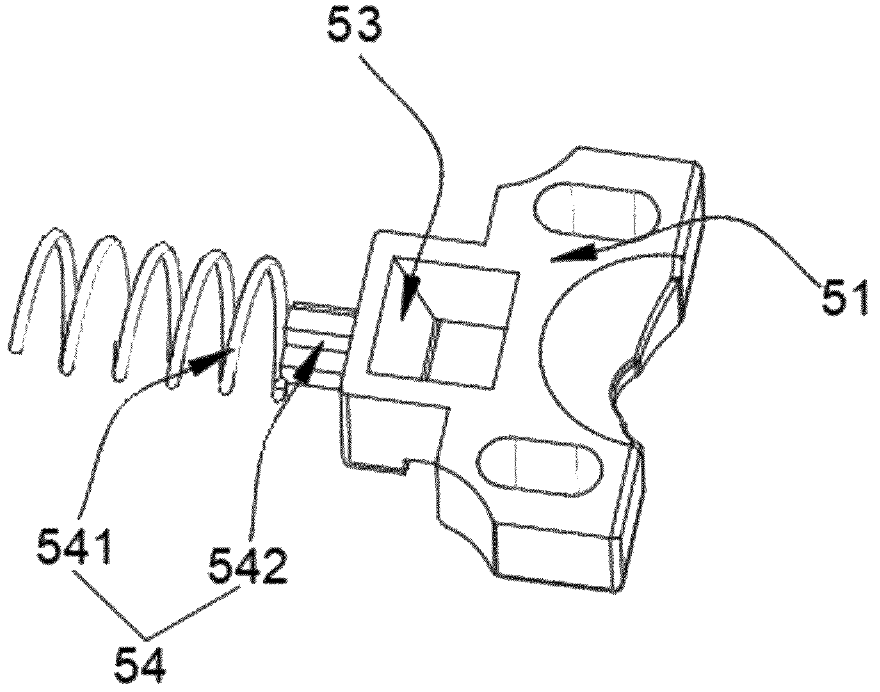
FIG. 4 is the schematic structural view of the left lock bolt and spring of the embodiment of the present invention.
Figure 5:
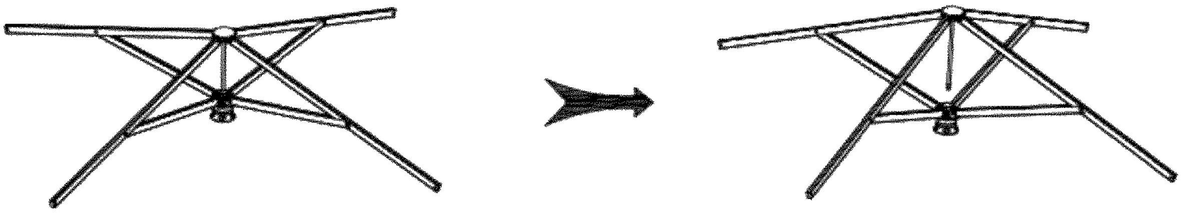
FIG. 5 is the schematic structural view of the tent pull-down lock in the embodiment of the present invention from the locked state to the unlocked state.

As shown in FIGS. 1 to 5, a pull-down lock comprises the top cover 1, wherein the circumferential surface of the top cover 1 can be hinged with the supporting rod through the hinge seat, the connecting rod is hinged on the supporting rod, the end of the connecting rod could be hinged on the movable part upper cover 4, the bottom end of the top cover 1 is fixedly connected with the pull rod 2, and the bottom end of the pull rod 2 is fixedly connected with the lock head 3;

It also comprises the movable part upper cover 4 for inserting the lock head 3, wherein the lock bolt component 5 for limiting and fixing the lock head 3 is arranged in the movable part upper cover 4, the movable part base 6 is slidably inserted into the bottom end of the movable part upper cover 4, the pull-down components 7 which is adapted to and penetrates through the lock bolt component 5 is arranged in the movable part base 6. When the movable part base 6 is pulled downward, the lock bolt component 5 could be pushed to move under the cooperation of the pull-down components 7 to release the limiting and fixing of the lock head 3.

When unlocking of the pull rod 2 and folding of tent is needed, the movable part base 6 could be pulled downwards, so as to drive the pull-down components 7 to move downwards, and the downward movement of the pull-down components 7 will push the lock bolt component 5 to move to the side far away from the pull rod 2, so that the lock bolt component 5 could release the limiting and fixing of the lock head 3. Therefore, the folding tent could be folded conveniently, the operation could be completed by one person with simple and convenient operation.

In a preferred embodiment of the present invention, the surface of the pull rod 2 is provided with an arc surface near its bottom end, the lock head 3 is in hemispherical shape, the diameter of the lock head 3 is larger than the cross-sectional diameter of the pull rod 2.

The diameter of the lock head 3 is larger than the cross-sectional diameter of the pull rod 2, so that the lock bolt component 5 could limit and fix the lock head 3 when clamping the pull rod 2. In a preferred embodiment of the present invention, the lock bolt support piece 8 for supporting the lock bolt component 5 is fixedly installed within the movable part upper cover 4 through the screws 9.

In a preferred embodiment of the present invention, the lock bolt component 5 comprises the left lock bolt 51 and the right lock bolt 52 which are slidably arranged on the lock bolt support piece 8, wherein the ends of the left lock bolt 51 and the right lock bolt 52 are both provided with arc grooves which are adapted to the arc surfaces, the guide surface is arranged above the arc grooves, so that the lock head 3 in hemispherical shape is convenient to push the left lock bolt 51 and the right lock bolt 52 apart from each other during the downward movement process. The left lock bolt 51 and the right lock bolt 52 are both provided with notches which could passed through by the pull-down components 7, and the inner walls of the notches are provided with inclined surfaces 53, the elastic thrust component 54 for pushing the left lock bolt 51 and the right lock bolt 52 to move and clamp the bottom end of the pull rod 2 is arranged in the movable part upper cover 4.

Under the thrust of the elastic thrust component 54, the left lock bolt 51 and the right lock bolt 52 could be pushed close to each other, so that the lock head 3 could be limited and fixed conveniently.

It should be noted that the elastic thrust component 54 includes the spring 541, one end of which abuts against the movable part upper cover 4, and the other end of which abuts against the left lock bolt 51 or the right lock bolt 52, and both the left lock bolt 51 and the right lock bolt 52 are fixedly connected with the guide column 542 inserted into the spring 541.

When the pull rod 2 is needed to be fixed, that is, when the tent needs to be fixed after unfolded, the pull rod 2 could be pulled to drive the lock head 3 to be inserted into the movable part upper cover 4. As the lock head 3 is arranged in the hemispherical shape and is matched with the guide surfaces on the left lock bolt 51 and the right lock bolt 52, the lock head 3 will overcome the elastic force of the spring 541 to push the left lock bolt 51 and the right lock bolt 52 apart from each other during the downward movement; as the lock head 3 continues to move downward and when the lock head 3 moves below the left lock bolt 51 and the right lock bolt 52, the push to the left lock bolt 51 and the right lock bolt 52 is released, so that under the elastic force of the spring 541, the left lock bolt 51 and the right lock bolt 52 are pushed to clamp the arc surface of the pull rod 2, thus realizing the limiting and fixing of the lock head 3.

It should be noted that the pull-down components 7 includes the fixing column 71 fixedly connected within the movable part base 6, which is provided with the placing groove for placing the lock head 3; two pull-down plates 72 penetrating through the notch are fixedly connected to the fixing column 71, the pull-down plates 72 include the inclined plate 721 and the straight plate 722, wherein the inclined plate 721 are fixedly connected to the fixing column 71, and the inclined surface of the inclined plate 721 is matched with the inclined surface 53 in the notch.

When the pull rod 2 needs to be unlocked, that is, when the tent needs to be folded, the movable part base 6 could be pulled downwards, and then the movable part base 6 drives the fixing column 71 and the pull-down plate 72 to move downwards. Due to the inclined plate 721 on the pull-down plate 72 is adapted to the inclined surface 53 on the notch, when the two inclined plates 721 move downwards, they will respectively push the left lock bolt 51 and the right lock bolt 52 to move away from each other against the elastic force of the spring 541, that is, the left lock bolt 51 and the right lock bolt 52 are separated from the pull rod 2, so that the limiting and fixing of the lock head 3 is released and the pull rod 2 is unlocked. Besides, the above operation is simple and convenient, and could be completed by one person without the cooperation of many people, thus improving the operation efficiency.

Hereinafter, embodiments of the present invention has been described in detail with reference to the accompanying drawings. While the description above refers to the particular embodiments of the present invention, it will be understood that many modifications may be made without departing from the spirit thereof. Any equivalent replacement or modification would fall within the protection scope of the present invention.

What is claimed is:

1. A pull-down lock comprises a top cover (1), a bottom end of the top cover (1) fixedly connected with the pull rod (2), and a bottom end of the pull rod (2) fixedly connected with a lock head (3), which comprises a movable part upper cover (4) for inserting the lock head (3), wherein a lock bolt component (5) for limiting and fixing the lock head (3) is arranged in the movable part upper cover (4); a movable part base (6) is slidably inserted into the bottom end of the movable part upper cover (4); a pull-down components (7) which is adapted to and penetrates through the lock bolt component (5) is arranged in the movable part base (6), and when the movable part base (6) is pulled downward, the lock bolt component (5) could be pushed to move under the cooperation of the pull-down components (7) to release the limiting and fixing of the lock head (3).

2. A pull-down lock according to claim 1, wherein a surface of the pull rod (2) is provided with an arc surface near its bottom end, the lock head (3) is in hemispherical shape, the diameter of the lock head (3) is larger than the cross-sectional diameter of the pull rod (2).

3. A pull-down lock according to claim 1, wherein a lock bolt support piece (8) for supporting the lock bolt component (5) is fixedly installed within the movable part upper cover (4) through screws (9).

4. A pull-down lock according to claim 3, wherein the lock bolt component (5) comprises a left lock bolt (51) and a right lock bolt (52) which are slidably arranged on the lock bolt support piece (8), wherein the ends of the left lock bolt (51) and the right lock bolt (52) are both provided with arc grooves which are adapted to the arc surfaces, the left lock bolt (51) and the right lock bolt (52) are both provided with notches which could passed through by the pull-down components (7), and the inner walls of the notches are provided with inclined surfaces (53), an elastic thrust component (54) for pushing the left lock bolt (51) and the right lock bolt (52) to move and clamp the bottom end of the pull rod (2) is arranged in the movable part upper cover (4).

5. A pull-down lock according to claim 4, wherein the elastic thrust component (54) includes the spring (541), one end of which abuts against the movable part upper cover (4), and the other end of which abuts against the left lock bolt (51) or the right lock bolt (52), and both the left lock bolt (51) and the right lock bolt (52) are fixedly connected with the guide column (542) inserted into the spring (541).

6. A pull-down lock according to claim 4, wherein the pull-down components (7) includes the fixing column (71) fixedly connected within the movable part base (6), two pull-down plates (72) penetrating through the notch are fixedly connected to the fixing column (71).

7. A pull-down lock according to claim 6, wherein the pull-down plates (72) include the inclined plate (721) and the straight plate (722), wherein the inclined plate (721) is fixedly connected to the fixing column (71), and the inclined surface of the inclined plate (721) is matched with the inclined surface (53) in the notch.

8. A pull-down lock according to claim 6, wherein the fixing column (71) is provided with the placing groove for placing the lock head (3).

* * * * *